Patented May 11, 1937

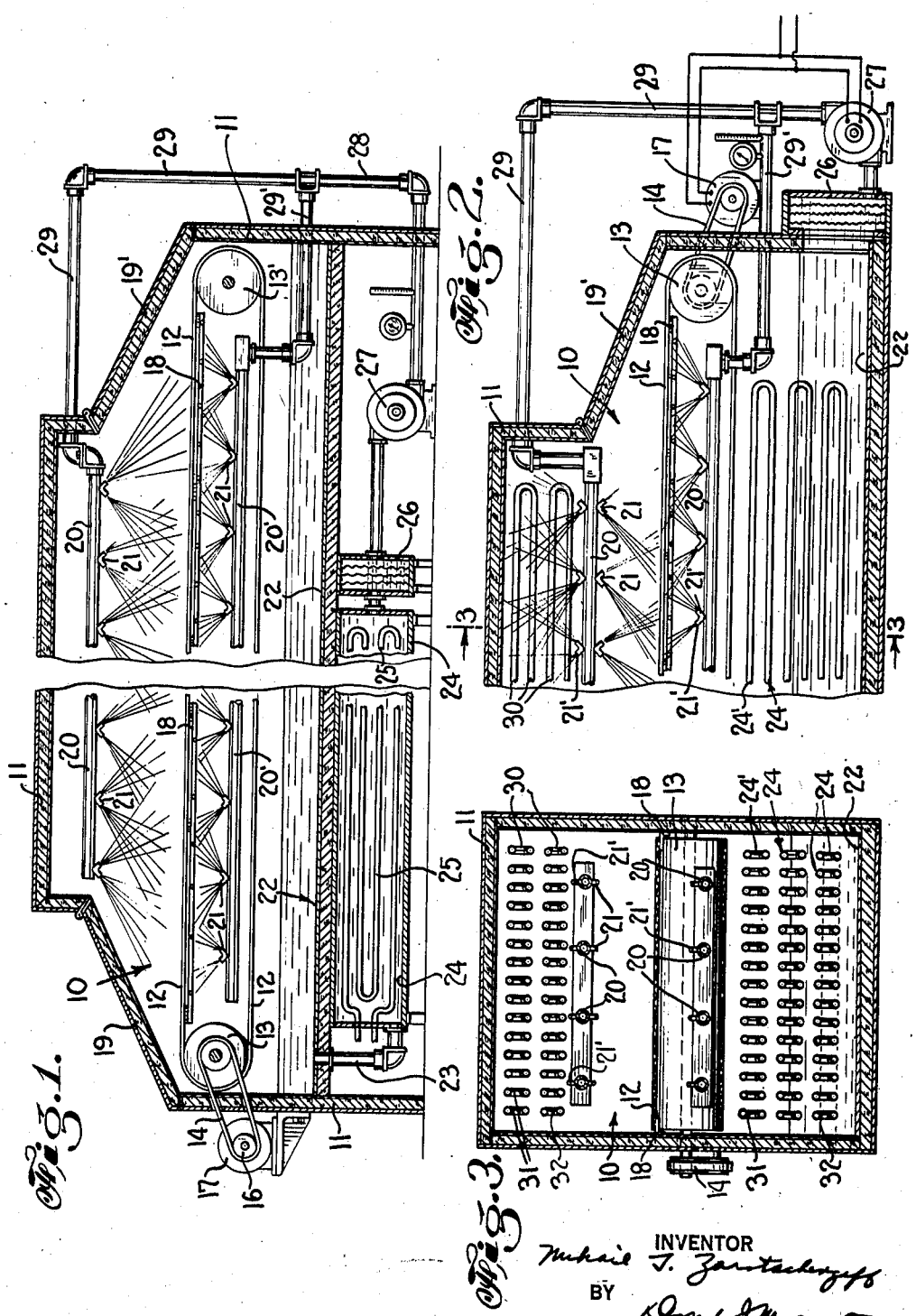

2,080,103

UNITED STATES PATENT OFFICE 2,080,103

METHOD AND APPARATUS FOR REFRIGERATING FOOD PRODUCTS

Mikail T. Zartschenzeff, New York, N. Y., assignor, by msne assignments, to Z Processes Inc., Jersey City, N. J., a corporation of Delaware Application April 10, 1934, Serial No. 719,839

7 Claims. (Cl. 62—104)

This invention relates to improvements in methods and apparatus for refrigerating food products, being particularly directed to a novel system wherein the products may be chilled or frozen in a continuous operation, with a maximum of rapidity and efficiency and a minimum of handling.

Broadly, it is an object of this invention to provide for a method and apparatus of the continuous type involving the use of a conveyor system operating in a tunnel or the like, the material being refrigerated by direct contact in all directions with a refrigerating medium.

Still further, it is an object of this invention to provide for a system of refrigeration, whereby material passing progressively through the freezing chamber or tunnel may be acted upon by atomized refrigerating liquid in the nature of a spray or fog, forming surface contact with the product from all directions, thereby providing for a rapid and efficient heat transfer.

Still further, it is an object of this invention to provide for a system of refrigeration whereby material passing progressively through a chamber or tunnel may continuously and progressively be contacted by constantly impinging spray or fog particles of refrigerating liquid acting upon the surface of the product from all directions, the spray or fog particles that have absorbed heat from the product being refrigerated being continuously superseded by additional cold spray or fog particles, thus providing for a continuous and positive contact of fresh refrigerant with the product being refrigerated in its progressive movement.

Still further, it is an object of this invention to provide for a structural formation for refrigeration purposes involving the continuous process in a tunnel or chamber comprising a movable carrier in the form of a perforate support passing through the chamber and disposed between and surrounded by atomizing or spray jets or nozzles whereby material on the conveyor may be subjected from all sides to the contact of spray particles during the progressive movement thereof on the carrier through the chamber, the apparatus being so constructed as to provide for a minimum of refrigerating liquid necessary for an efficient operation.

These and other advantages, capabilities and features of the invention will appear from the subjoined detailed description of one specific embodiment thereof illustrated in the accompanying drawings, in which Figure 1 is a front elevation in cross-section longitudinally of a tunnel incorporating this invention.

Figure 2 is a front elevation in cross-section longitudinally of a portion of a tunnel incorporating a modified form of this invention.

Figure 3 is an end elevation in section taken along lines 3—3 of Figure 2.

Figure 4:
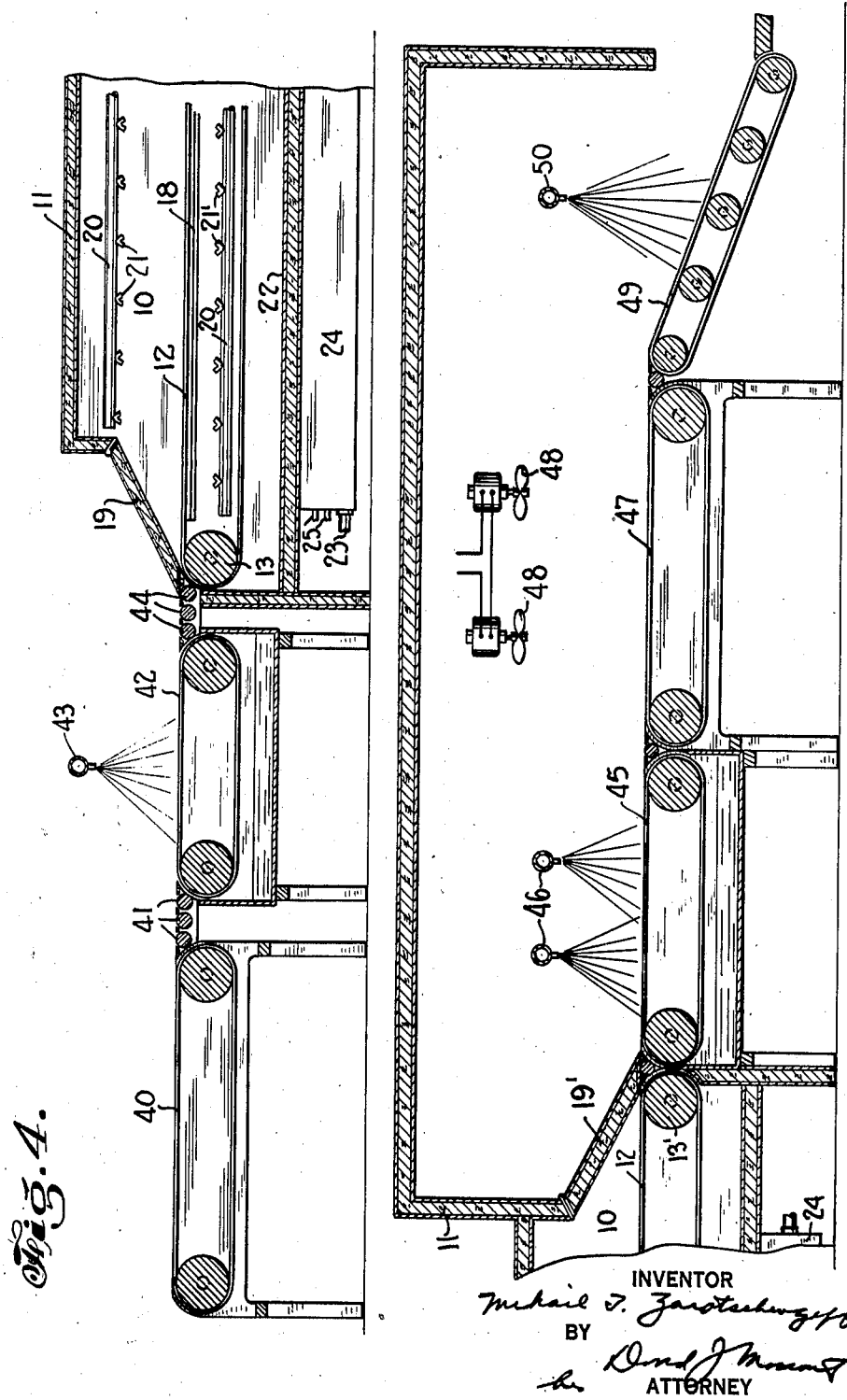
Figure 4 is a front elevation in section longitudinally of a tunnel and other elements in treating products in a series of steps.

Referring to the reference characters in the drawings, numeral 10 represents a tunnel which is substantially an elongated rectangular chamber, the walls of which are insulated as at 11. Within the tunnel and extending longitudinally thereof there is disposed a conveyor 12 comprising a perforated continuous belt carried on drums 13 and 13' and actuated by drive belt 14 interconnected between driven pulley 15 carried on drum 13 and driving pulley 16 forming a part of or actuated by a driving motor or the like 17. In order that the conveyor 12 be maintained in position there are provided marginal supporting angle irons 18 at opposite sides of the chamber. The perforated conveyor belt 12 is preferably made of a non-corrosive material such as stainless steel or Monel wire, or may be a perforated metal sheet or the like.

At opposite ends of the tunnel are provided flap doors 19 and 19' for carrying on refrigeration below the freezing point; if ordinary cooling or chilling is desired such doors may be omitted or the flaps may be left up. Within the tunnel and located respectively above and below the conveyor 12 are coil series 20 and 20', each of which comprises a plurality of lengths of conducting pipe, along which are disposed in spaced relationship atomizing nozzles 21, each having one or more outlets for discharging the refrigerant in the form of a spray or fog, various types of refrigerants being applicable, the most economical and convenient being salt brine. The atomized liquid, as shown in Figure 1, is therefore discharged above and below the upper length of the perforate conveyor passing through the same in either direction to contact directly with the product carried thereon and being refrigerated in the tunnel. The refrigerant thus sprayed contacts with the product being refrigerated, withdraws heat therefrom, and drops into the refrigerant basin 22 at the base of the tunnel. The refrigerant in the basin 22 passes through pipes 23 into the refrigerant cooler 24 in which are disposed refrigerant cooling pipes 25 carrying $CO_2$ or ammonia gas, or any other refrigerating agent, about which the refrigerant liquid coming from basin 22 may pass and which through contact therewith will bring the refrigerant down to proper cold temperature; from the refrigerating cooling chamber 24 the re-cooled refrigerant passes into filter chamber 26 and thence into pump 27 whence it is redelivered through conduit 28 into the upper and lower conduits 29 and 29' leading to distributor pipes 20 and 20' from which the sprays are discharged. By means of this simplified system there is a constant flow of refrigerating liquid circulating in the manner specified.

Referring particularly to the disclosure in Figures 2 and 3 a modified form of the invention is shown, wherein in the tunnel or chamber 10 there are disposed the usual perforated conveyor 12 carried on drums 13 driven by motor 17 to belt 14 connected between the motor and drum.

In this modification, however, the refrigerant cooling system is modified to provide for the disposition of refrigerant cooling coils within the shallow basin 22, the coils being provided in several series, see Figure 3, and having a considerable portion 24' thereof above the level of the refrigerant in the basin; in conjunction with cooling coils 24 there are disposed above spray conduit 20 a series of cooling coils 30, both coil series 24 and 30 being supplied by a common source through pipes 31 with $CO_2$, ammonia gas or other cooling media, there being a common return system for such cooling media to pipes 32. It should be noted that the spray conduit 20 is equipped with a plurality of series of atomizing nozzles, those downwardly directed as at 21 and those upwardly directed as at 21', the spray or fog from nozzles 21' being directed against cooling coils 30, so that the atomized refrigerant discharged into the chamber may be maintained at proper freezing temperatures and at the same time moisten the cooling coils 30 and 24 and thus provide for better interchange of heat between the spray or fog contacting with the coils and the refrigerant within the coils.

As can be readily seen, the cooling coils 24' and 30 carrying gaseous refrigerant, in conjunction with their function of maintaining the atomized refrigerant at low temperatures and maintaining the spray or fog at low temperature by withdrawing therefrom heat absorbed by the spray or fog from the products being refrigerated, before the spray or fog portions condense and drop into the basin 22, may serve also indirectly to maintain the chamber 10 at the required low temperature and also may serve to pre-cool the tunnel or chamber prior to the application of the spray, thereby to bring about quick freezing efficiently and economically.

Referring to the modification shown in Figure 4, essentially the same freezing chamber or tunnel arrangement is shown as in Figure 1, although this spraying tunnel or chamber may be the same in construction and operation as that shown in Figures 2 and 3.

In this modification there is shown a continuous process for handling and freezing whole fish, although the same may be applied for various other products. As the fresh fish arrive at the plant they are washed clean and otherwise prepared for the freezing operation, if necessary being trimmed and gutted, such operation being carried out on conveyor 40. From this table the products are moved over rollers 41 onto the fish cleaning or spraying table 42, where they are finally cleaned with sprays of cold water 43 and led over rollers 44 onto conveyor 12 in the tunnel 10, the door 19 of the tunnel being kept open for such operation. In the tunnel or freezing chamber 10 the fish is acted upon in the manner described in Figures 1 to 3 inclusive. In this freezing chamber or tunnel the fish slowly pass under sprays of sodium chloride brine maintained generally at about a temperature of minus 3° F., the fish being frozen very rapidly, the period depending on the size of the fish, between twenty minutes and two hours, and with respect to smaller fish products, such as shrimp and the like, within a few minutes, the tunnel for large fish being 50 to 100 feet, and that for shrimps and the like being 20 or 30 feet long.

As the fish is frozen it leaves the freezing chamber or tunnel passing onto carrier belt 45 where the frozen fish are sprayed by tepid water conveniently taken off from the refrigerating condenser in order to remove all traces of salt brine on the surface of the fish. The washed fish then pass to a conveyor 47 where the same are dried by circulating air directed by fans 48, after which the frozen fish may be glazed when passing along conveyor 49 leading towards the storage room by means of cold water spray 50 maintained at 34° to 38° F.; although instead of spraying the fish the same may be dipped into a tank containing cold water.

Although the disclosure here shows whole fish being refrigerated, it is within the province of this invention to provide for freezing fish and other products in pans, which may be perforated metal devices or wire mesh baskets.

With respect to freezing ducks or poultry or the like, the process may be carried out by adopting several of the steps shown in Figure 4, by applying in general the various conveyors there shown to carry out different operations. In general, however, with ducks or poultry, instead of being disposed directly on the perforate conveyor the same are disposed within frames without top or bottom, the same being packed and handled on conveyor belt 40, and frozen with the sodium chloride brine at a temperature close to minus 3° F., in the freezing chamber or tunnel, being then washed by clear water spray 46 on conveyor 45, and dried on the conveyor 47 by the fans 48. The spray 50 may be eliminated, if desired, with respect to ducks, but on the conveyor 49 the ducks may be packaged as by being wrapped in waxed paper for transfer into individual containers or disposed in wholesale boxes holding a dozen or more pieces.

In handling and freezing packaged products, the conveyor 40 may be used but the washing step above conveyor 42 is eliminated from whence the packages are delivered into the freezing chamber or tunnel, where they are subjected to a sodium or calcium brine or other form of spray for freezing. As the packaged products leave the freezing chamber or tunnel there usually will be drops of liquid adhering to the same, and in order to remove these drops the packages are passed under the spray of conveyor 45, thence on conveyor 47 to be dried by air actuated by the fans 48, from which point they are sent along conveyor 49 for delivery. Spray 50 is eliminated in this case.

It should be noted that although a single conveyor belt 12 or single conveyors such as are shown in the illustrations in the drawings, it is well within the province to have several series of sprays and conveyors disposed parallelly or adjacent one another in an enlarged tunnel or chamber.

Further, series of conveyors may be disposed one above another so as to provide for multiple production within a refrigerating tunnel.

It is obvious that various changes and modifications may be made to the details of construction without departing from the general spirit of the invention as set forth in the appended claims:

I claim:

1. A device for quick freezing food products comprising an elongated chamber, means to supply a quick freezing refrigerant under pressure, means positioned within the chamber and communicating with the supply means for directing the refrigerant in spray and finely divided form in a direction to impinge against the exposed surfaces of the products passing through the chamber, whereby the refrigerant will impinge against substantially all portions of the products and transfer heat therefrom by conduction resulting from direct impact contact thereof with all portions of the products, and means to introduce products into the chamber at one end thereof and remove the same at the other end thereof to cause the products to move through the chamber.

2. A device for quick freezing food products comprising an elongated chamber, means to supply a quick freezing refrigerant under pressure, means to convey products through the chamber, means within the chamber and communicative with the supply means for directing the refrigerant in spray and finely divided form in a direction to impinge against substantially all portions of the products and from opposite sides of the conveying means, whereby the refrigerant will impinge against substantially all sides of the products and transfer heat therefrom by conduction resulting from direct impact contact thereof with all portions of the products.

3. A device for quick freezing food products comprising an elongated chamber, means to supply a quick freezing refrigerant under pressure, perforate means to convey products through the chamber, means within the chamber and communicative with the supply means for directing the refrigerant in spray and finely divided form in a direction to impinge against substantially all portions of the products and from opposite sides of the conveying means, whereby the refrigerant will impinge against substantially all sides of the products and transfer heat therefrom by conduction resulting from direct impact contact thereof with all portions of the products.

4. A device for quick freezing food products comprising an elongated chamber, means to supply a quick freezing refrigerant under pressure, means to convey products through the chamber, oppositely spaced refrigerating coils communicating with the supply means, means connected to the coils to spray the refrigerant in finely divided form to impact upon substantially all sides of the products, whereby the coils will withdraw heat from the sprayed refrigerant and the refrigerant will impinge against substantially all sides of the products and transfer heat therefrom by conduction resulting from direct contact thereof with the products.

5. A device for quick freezing food products comprising an elongated chamber, means to supply a quick freezing refrigerant under pressure, means positioned within the chamber and communicating with the supply means for directing the refrigerant in spray and finely divided form in a direction to impinge against the exposed surfaces of the products passing through the chamber, whereby the refrigerant will impinge against substantially the entire surface of the products and transfer heat therefrom by conduction resulting from direct contact thereof with the products, means to introduce products into the chamber at one end thereof and remove the same at the other end thereof to cause the products to move through the chamber, means for washing the adhering refrigerant from the products and thereafter drying the same, and means for spraying the dried products with water and forming an ice glaze thereon during such motion.

6. A method of quick freezing food products comprising passing the products through a freezing chamber, directing a quick freezing refrigerant in spray and finely divided form against substantially all sides of the products passing through the chamber to cause the refrigerant to impinge against substantially the entire surface of the products and transfer heat therefrom by conduction resulting from direct contact thereof with substantially all sides of the products, and removing the quick frozen products from the chamber.

7. A method of quick freezing food products comprising passing the products through a freezing chamber, directing a quick freezing refrigerant in spray and finely divided form against the products passing through the chamber to cause the refrigerant to impinge against substantially the entire surface of the products and transfer heat therefrom by conduction resulting from direct contact thereof with substantially all sides of the products, washing the products to remove adhering refrigerant, and finally spraying with cold water to form an ice glaze thereon.

MIKAIL T. ZAROTSCHENZEFF.